United States Patent
Benckenstein, Jr. et al.

(10) Patent No.: US 7,157,881 B1
(45) Date of Patent: *Jan. 2, 2007

(54) SAFETY DEVICE FOR MANAGING BATTERIES

(75) Inventors: Claude Leonard Benckenstein, Jr., Sugar Land, TX (US); David Allen White, Houston, TX (US)

(73) Assignee: Southwest Electronic Energy Corporation, Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/293,430

(22) Filed: Dec. 2, 2005

(51) Int. Cl.
*H02J 7/00* (2006.01)

(52) U.S. Cl. ................... 320/119; 320/116

(58) Field of Classification Search ............ 320/112, 320/116, 117, 118, 119
See application file for complete search history.

(56) References Cited

U.S. PATENT DOCUMENTS

| | | | | |
|---|---|---|---|---|
| 4,851,756 A | * | 7/1989 | Schaller et al. ......... | 320/126 |
| 5,461,264 A | * | 10/1995 | Yang ...................... | 307/81 |
| 5,619,417 A | * | 4/1997 | Kendall ............. | 320/DIG. 13 |
| 5,736,833 A | | 4/1998 | Farris ................... | 320/21 |
| 5,900,717 A | | 5/1999 | Lee ...................... | 320/150 |
| 6,037,750 A | * | 3/2000 | Von Novak ........... | 320/132 |
| 6,437,539 B1 | | 8/2002 | Olsson ................. | 320/118 |
| 6,844,703 B1 | | 1/2005 | Canter ................. | 320/131 |
| 6,873,134 B1 | | 3/2005 | Canter ................. | 320/118 |
| 2005/0275372 A1 | | 12/2005 | Crowell ................ | 320/112 |

OTHER PUBLICATIONS

DelRossi, Rich; "Cell Balancing Design Guidelines"; Microchip Technology, 2002. pp. 1-13.

* cited by examiner

*Primary Examiner*—Karl Easthom
*Assistant Examiner*—Aaron Piggush
(74) *Attorney, Agent, or Firm*—Wendy K. Buskop; Buskop Law Group PC

(57) ABSTRACT

A safety device for lithium ion cells or groups of lithium ion cells connected in parallel and in series by providing a continuously balanced state of charge while in a discharge phase, a charge phase, a quiescent phase, a storage phase, or combinations of these phases.

16 Claims, 8 Drawing Sheets

SAFETY DEVICE FOR MANAGING BATTERIES

FIELD

The present embodiments relate to a safety device for balancing cells or groups of cells connected in series and in parallel forming a battery pack system for use in various applications such as, transportation, communication, oil and mineral exploration, oceanographic research and monitoring, pipeline monitoring and maintenance, various medical applications, and various portable applications including military applications.

BACKGROUND

Lithium ion battery technology is becoming the standard for rechargeable energy storage systems. Lithium ion batteries are able to store up to three to four times as much electric energy as currently used rechargeable batteries.

However, current lithium ion battery pack system technology has the disadvantage that it can explode after long periods of inactivity unless complex and costly electronic control and balancing circuitry is used.

Accordingly, there exists a need to make a safety device for a battery pack system which has continuously active control circuits and is rapidly available for use at all times.

Currently, balancing the capacities of the series connected cells in a battery pack system is usually accomplished through the use of resistors connected by switches across each cell combined with cell voltage monitoring and computer control. The resistors dissipate a relatively small amount of power and are activated infrequently. Large battery packs with multiple sources differential leakage currents cause the battery pack capacity to diminish and not be available for rapid use at all times. These battery packs may even explode.

A need exists for a safety device to continuously minimize the loss of capacity of a large battery pack system and prevent the possibility of explosion, leakage, or other unexpected activity.

The present embodiments address these needs.

BRIEF DESCRIPTION OF THE DRAWINGS

The detailed description will be better understood in conjunction with the accompanying drawings as follows.

Figure 1:
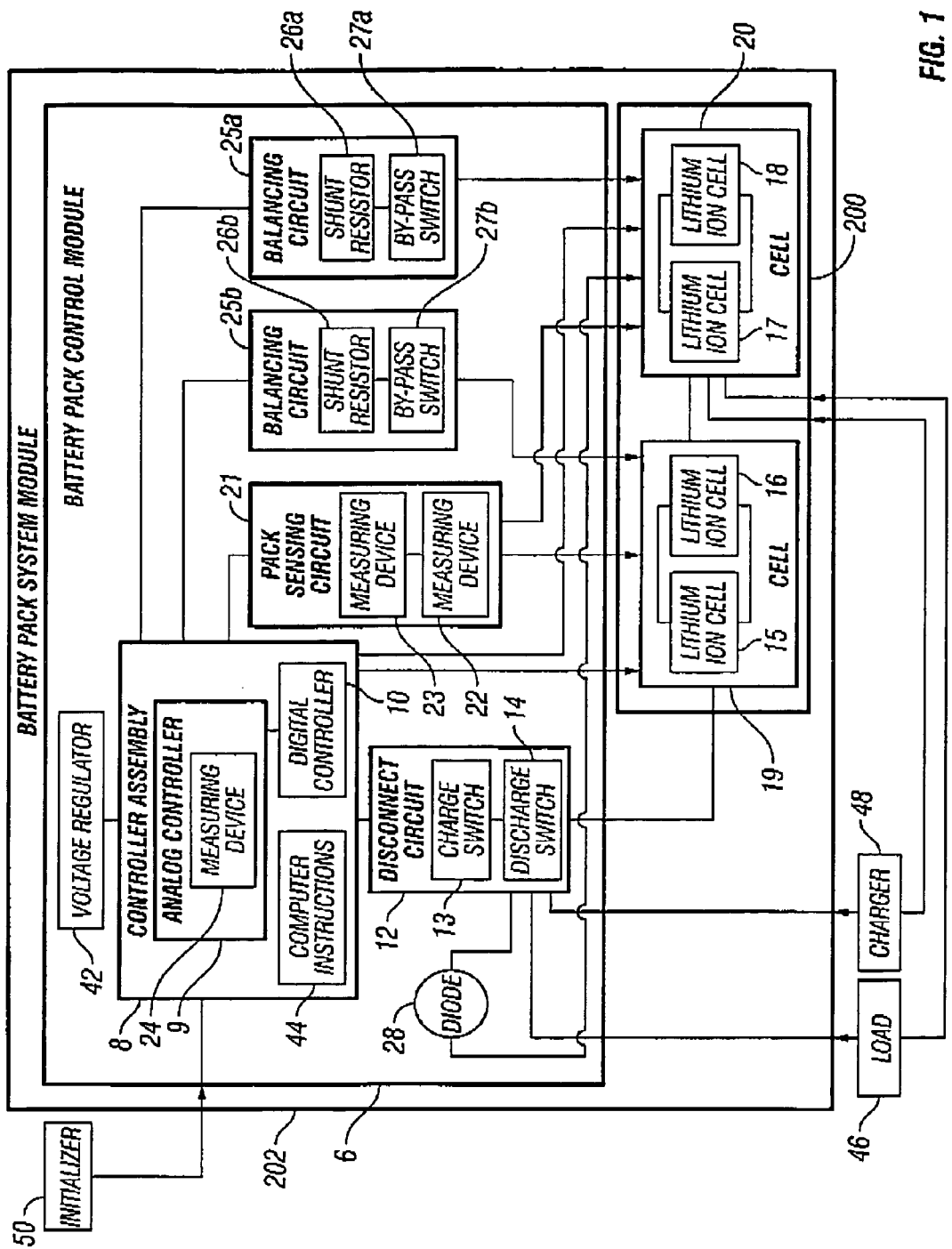
FIG. 1 depicts a battery pack system module with safety circuitry according to an embodiment of the invention, showing a reverse voltage protection diode.

The present embodiments are detailed below with reference to the listed Figures.

DETAILED DESCRIPTION OF THE EMBODIMENTS

Before explaining the embodiments in detail, it is to be understood that the embodiments are not limited to the particular description, and that they can be practiced or carried out in various ways.

Cell balancing incorporated with protection circuits has only been available for 4 series lithium ion cells. Traditionally, balancing is only accomplished during the charge phase. The embodiments address cell balancing in any one of four states, which include quiescent, charge, discharge and storage.

The present embodiments address the need for a safety device that balances cells while providing protection circuits for more than 4 series lithium ion cells.

The present invention is directed toward a safety device that can extend the power duration of battery packs of lithium ion cells to create high energy per ounce battery packs with a longer life in comparison to lead acid or other rechargeable batteries. Lithium ion cells and lithium ion battery packs are highly desirable as a source of power because of their high energy capacity, low weight, small size, and potential for long life. The present embodiments should also work with various types of battery systems.

The safety device can enable lithium ion battery pack systems to be balanced at all times or continuously balanced, thereby extending the life cycle of the lithium ion cells or groups of lithium ion cells. The safety device can enable minimal loss of capacity of the battery pack system while providing a light weight, continuously balanced battery pack.

The safety device can cause improved power duration for balanced lithium ion cells or groups of lithium ion cells connected in series, or connected in parallel and in series.

The safety device can monitor and measure parameters for a plurality of lithium ion cells connected in parallel or groups of lithium ion cells connected in parallel and in series. The present embodiments are used to determine the relative state of charge for individual lithium ion cells connected in parallel or for groups of lithium ion cells connected in parallel and in series.

To balance the cells or groups of cells, the safety device can remove at least a portion of a charge of a cell or groups of cells to achieve a balanced state of charge for the plurality of individual lithium ion cells connected in series, or groups of lithium ion cells connected in parallel and in series, even if the cells are in a discharge phase, a charge phase, a quiescent phase, a storage phase, or combinations of these conditions.

The safety device for balancing a plurality of cells or groups of cells connected in series can include a controller assembly including an analog controller and a digital controller; a disconnect circuit, with a charge switch and a discharge switch connected in series, engaging the controller assembly and the plurality of cells or groups of cells connected in series; a pack sensing circuit with means for measuring battery pack control module temperature, means for measuring battery pack control module current, means for measuring cell voltages, or possibly combinations thereof.

The pack sensing circuit can connect to the controller assembly and the plurality of cells or groups of cells connected in series. A balancing circuit with a shunt resistor connected to a by-pass switch can be used wherein the balancing circuit connects between the plurality of cells or groups of cells connected in series and engages the controller assembly. The safety device can also include computer instructions for instructing the controller assembly to control the disconnect circuit and the balancing circuit. The safety device continuously balances the plurality of lithium ion cells or groups of lithium ion cells connected in parallel and in series even if the battery pack is in a charging phase, a discharging phase, a quiescent phase, or a storage phase.

The safety device can be better understood with reference to the figures.

FIG. 1 depicts a safety device 6 with protective circuitry that includes a reverse voltage protection diode 28 usable in an embodiment of the invention. The reverse voltage protection diode 28 connects to a disconnect circuit 12, and a group of cells connected in parallel 20.

The safety device 6 can include a controller assembly 8 connected to the disconnect circuit 12. The controller assembly 8 can communicate with the voltage regulator 42, a monitor or initializer 50, a balancing circuit 25a and 25b, and a pack sensing circuit 21. A device for measuring for measuring cell voltage 24 can be used within the controller assembly 8.

The controller assembly 8 connects to the series connected groups of cells connected in parallel 19 and 20. If the device for measuring cell voltage 24 is outside of the controller assembly 8, the pack sensing circuit 21 connects directly to the series connected groups of cells connected in parallel 19 and 20, and the controller assembly 8 does not have to connect directly to the series connected groups of cells connected in parallel 19 and 20.

The controller assembly 8 can include an analog controller 9 and a digital controller 10. The controller assembly 8 can include a reverse voltage protection diode 28 to prevent excessive voltage from developing across the controller assembly 8, the voltage regulator 42, and the disconnect circuit 12.

An exemplary analog controller 9 can be one available from Texas Instruments of Dallas Tex., Part Number BQ29312A.

An exemplary digital controller 10 can be circuitry that includes one or more analog I/O ports, one or more digital I/O ports, a processor, which could be a microprocessor, memory which can be a flash memory having processing logic in the memory, and additional computer instructions in the memory for directing the processor.

The digital controller has at least one configuration table. The configuration table can be a table, groups of tables, or can be programmable data about the cells to be balanced. Additional data storage can be used in communication with the processor for storing the configuration table, as well as storing computer instructions for operating the circuitry of the balancing circuit and for storing additional data related to the configuration table. The data storage can include the monitored and measured data obtained by the safety device, such as cell voltage, current and/or temperature. The monitored and measured data can be recorded and stored in a database format or a table format.

Disconnect circuit 12 can include a charge switch 13 and a discharge switch 14 connected in series. The charge switch 13 can be a transistor switch such as a Vishay P-FET switch of Malvern, Pa. The discharge switch 14 can be the same part as the charge switch or a similar type of switch.

A lithium ion cell 15 can be connected in parallel to a lithium ion cell 16. A lithium ion cell 17 can be connected in parallel to a lithium ion cell 18. A plurality of lithium ion cells 19 connected in parallel can be connected in series to a plurality of lithium ion cells connected in parallel 20. A plurality of parallel-connected lithium ion cells 19 and 20 can be connected as groups in series 200.

In this embodiment, balancing circuits 25a and 25b can be used. Each balancing circuit 25a and 25b can include shunt resistors, 26a and 26b respectively, and bypass switches 27a and 27b respectively.

In an embodiment, the shunt resistor can be used across groups of cells connected in parallel through the bypass switch.

The pack sensing circuit 21 can be used to measure any combination of cell voltages in groups of cells in series. The pack sensing circuit 21 can also be used to measure temperatures of a cell, temperatures of groups of cells, or temperatures between groups of cells. The pack sensing circuit 21 can be used to measure in groups of cells in series 200. The pack sensing circuit also has a device for measuring cell voltages 24 between cells, between groups of cells or combinations thereof. One or more current measuring, cell voltage measuring and/or temperature measuring devices can be used in the embodiments.

Continuing with FIG. 1, the device for measuring cell voltages 24 between cells, between groups of cells or combinations thereof, can be internal to the analog controller 9. The means measuring cell voltages can be within the analog portion of the controller assembly 8. An example of a device usable for measuring cell voltages could be a Texas Instrument analog controller that additionally measures voltage, which is available from Texas Instruments of Dallas, Tex.

The pack sensing circuit 21 can include a device for measuring battery pack temperature 22, which can be external to the controller assembly 8. This temperature sensing device can be any thermistor, such as those from CTS of Elkhart, Ind.

The pack sensing circuit 21 of FIG. 1 includes a device for measuring battery pack current 23 which can be external to the controller assembly 8. The device for measuring battery pack current can be a resistor, such as those available from Vishay of Malvern, Pa.

The balancing circuits 25a and 25b include shunt resistors 26a and 26b connected to a by-pass switches 27a and 27b. The by-pass switch 27a or 27b can be a semiconductor switch, a variable resistor, a mini-micro switch or combinations of these devices. The balancing circuits 25a and 25b can be used to connect between the plurality of cells 15, 16, 17, and 18 or between the groups of parallel connected cells 19 and 20 which can be connected in series 200. The controller assembly 8 can activate balancing activity by engaging or controlling the balancing circuits 25a and 25b.

Computer instructions 44 can be used with the controller assembly 8 to direct the controller assembly 8 to activate disconnect circuit 12 to disconnect cells from a load 46 or a charger 48 and thereby enhancing the balancing of the groups in series 200, and for battery pack system module 202 safety.

The computer instructions 44 can be stored in the memory of a processor of a computer or server usable in the embodiments, which can include instructions to initialize and control the analog controller 9 for battery pack system module 202 safety and to enable or disable individual balancing circuits 25a and 25b at anytime, to keep groups of cells in series 200 continuously in balance.

The embodiments contemplate using a battery pack control module 6 with a voltage regulator 42 for powering the controller assembly 8. The voltage regulator 42 can be a DC programmable voltage regulator such as those made by Linear Technology, Inc. of Malpitas, Calif.

The embodiments contemplate that a monitor or initializer 50 can be connected to the controller assembly 8, such as the type made by Hewlett Packard of Palo Alto, Calif.

A load 46, which is also referred to herein as an application, can be connected to a battery pack system module 202. A charger 48 can be connected to the battery pack system module 202. In FIG. 1, a line is depicted around battery pack control module 6 with the plurality of cells connected in parallel, further connected in series 200, which is hereafter termed "a battery pack system module 202."

Figure 2:
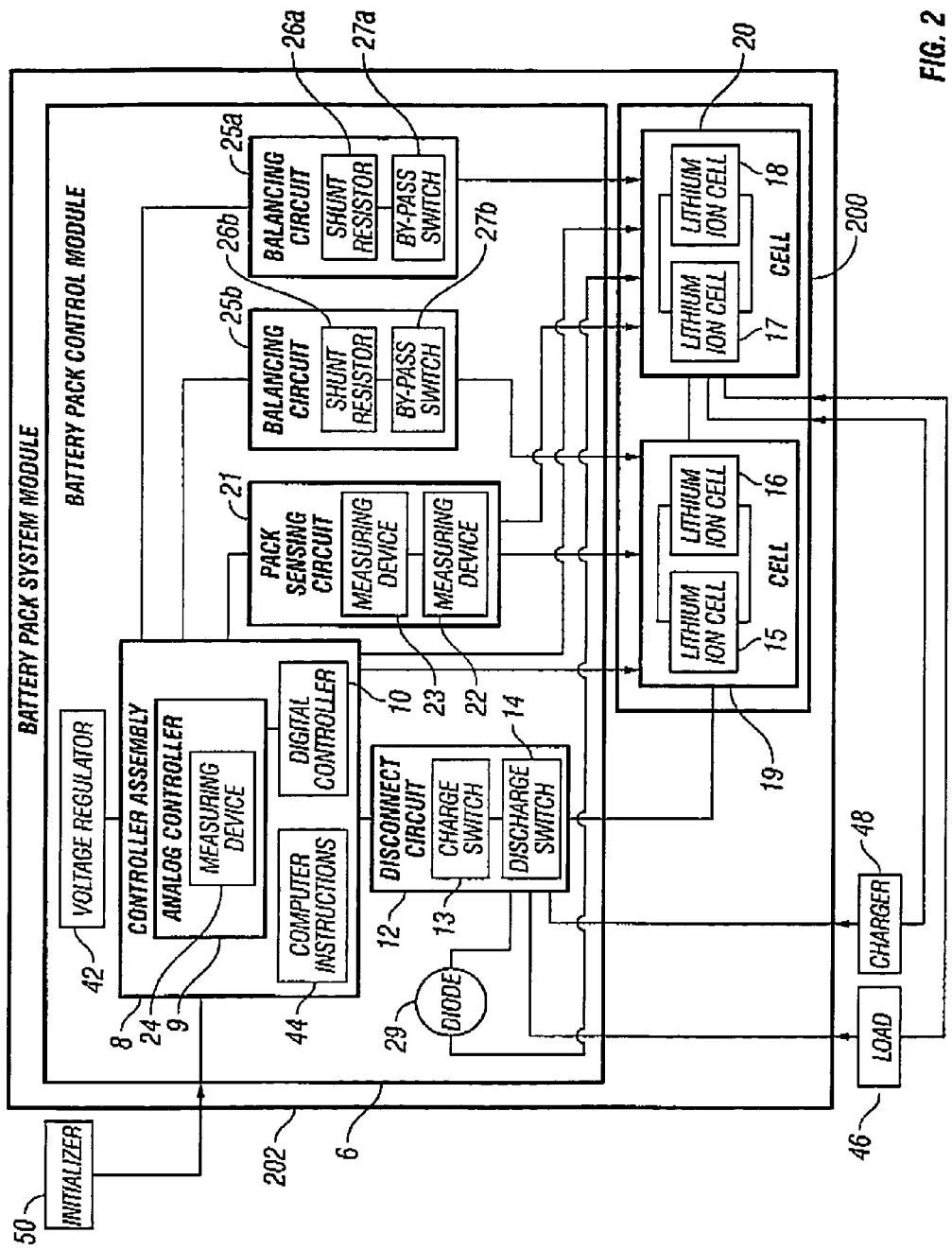
FIG. 2 depicts a battery pack system module with safety circuitry according to another embodiment of the invention with a bypass diode.

FIG. 2 depicts an alternative embodiment of the invention. A bypass diode 29 can be utilized instead of a reverse voltage protection diode 28 as shown in FIG. 1. Bypass diodes are available from ON Semiconductor of Phoenix, Ariz., and Vichay of Malvern, Pa.

Figure 3:
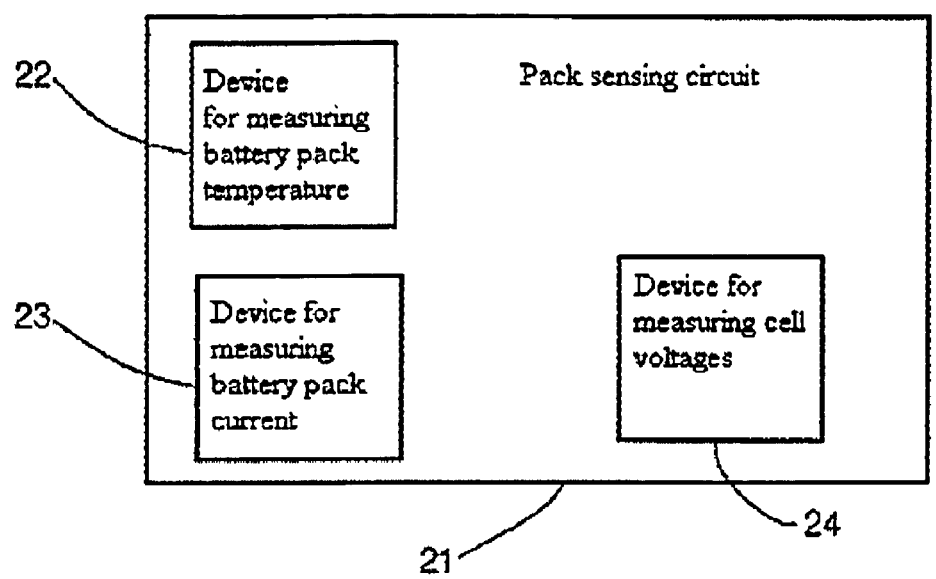
FIG. 3 depicts a pack sensing circuit usable with the safety device of the invention.

FIG. 3 provides a detailed view of the pack sensing circuit 21 usable in an embodiment. The pack sensing circuit 21 of FIG. 3 is shown with a device for measuring battery pack temperature 22, a device for measuring battery pack current 23, and a device for measuring cell voltages 24.

Figure 4:
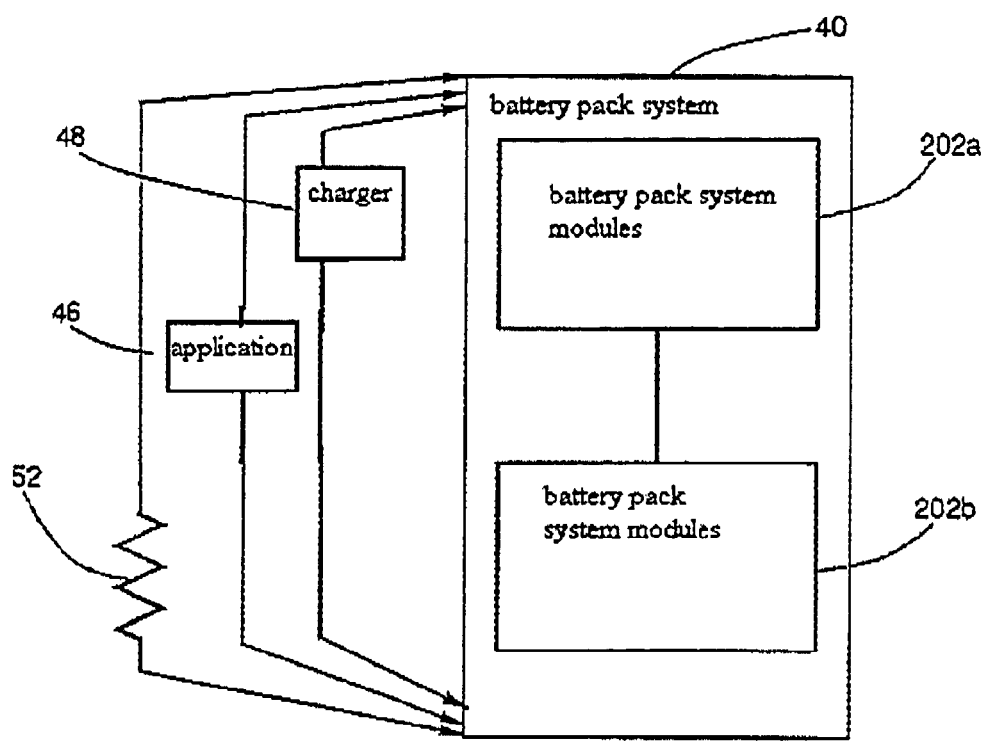
FIG. 4 depicts a battery pack system with battery pack system modules connected in series presenting a safety system according to an embodiment of the invention.

FIG. 4 depicts a detailed view of a battery pack system 40. The battery pack system 40 depicts a plurality of at least two battery pack system modules shown connected in series as elements 202a and 202b to form a battery pack system 40. The battery pack system modules 202a and 202b typically have the same number of groups of cells connected in parallel but need not contain the same number of these parallel groups connected in series. The plurality of cells or groups of cells are lithium ion cells, such as those sold through Southwest Electronic Energy Corporation of Houston, Tex.

FIG. 4 shows an application 46 connected to a battery pack system 40 and a charger 48 connected to the battery pack system 40. A discharge resistor 52 is depicted connected to the battery pack system 40. Discharge resistors are available from Vishay of Malvern, Pa.

The embodiments contemplate balancing the state of charge of at least two battery pack system modules connected in series 202a and 202b by discharging the battery pack system 40 using a discharge resistor 52 until a balanced state is achieved. The bypass diode 29 shown in FIG. 2 that is contained within each battery pack system modules 202a, 202b facilitate the balancing of these two series connected battery pack system modules.

The battery pack system modules 202a and 202b are contemplated to be available for use anytime, even if the battery pack system 40 has been in an idle state, a discharge state, a quiescence state or in storage, which can be long term storage. The battery pack system modules 202a and 202b can be individually available for use at full capacity any time due to the internal balancing circuit shown in FIG. 1 and FIG. 2. Alternatively, if the battery pack system 40 contains battery pack system modules 202a and 202b that are not balanced, the battery pack system 40 will require the discharge balancing described above before the battery pack system 40 is available at full capacity.

Figure 5A:
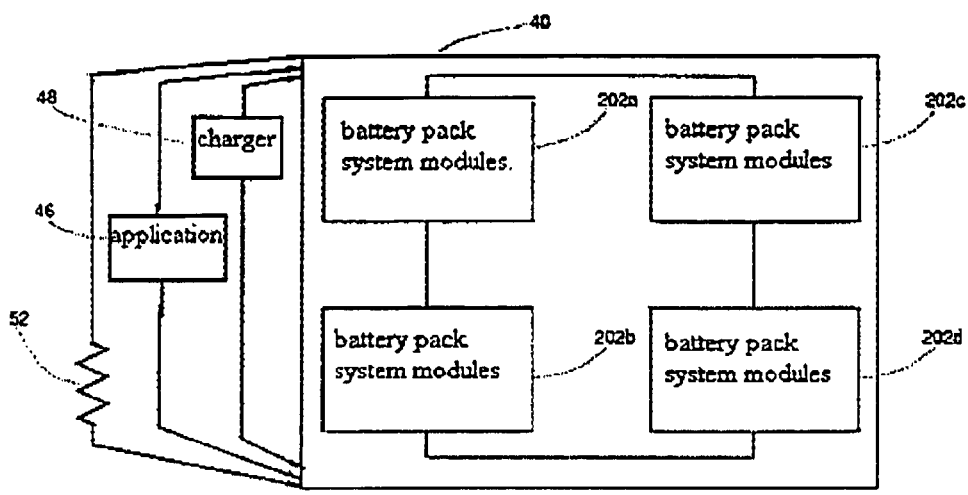
FIG. 5 depicts battery pack system containing battery pack system modules with the safety circuitry, wherein the modules are connected in parallel and in series.
Figure 5B:
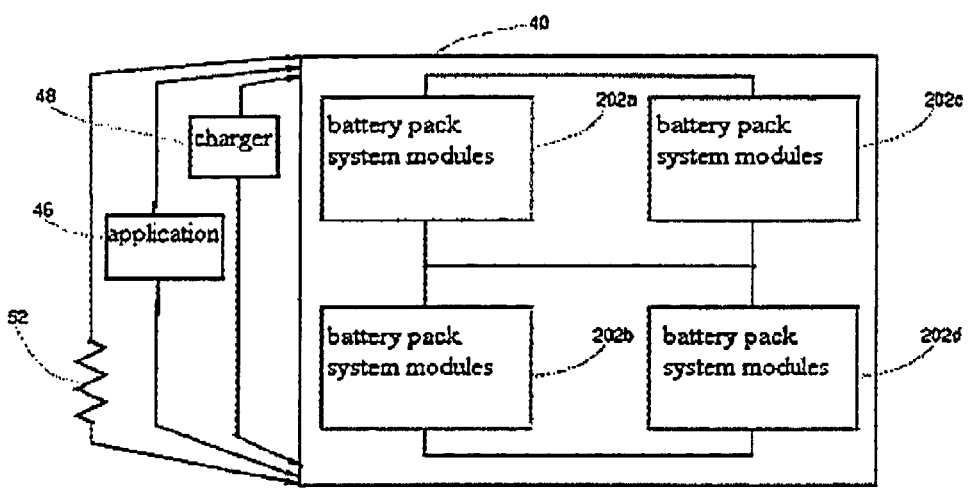

FIG. 5a and FIG. 5b depicts a plurality of battery pack systems containing at least two battery pack system modules that are connected both in parallel and in series 202a, 202b, 202c, and 202d.

Figure 6:
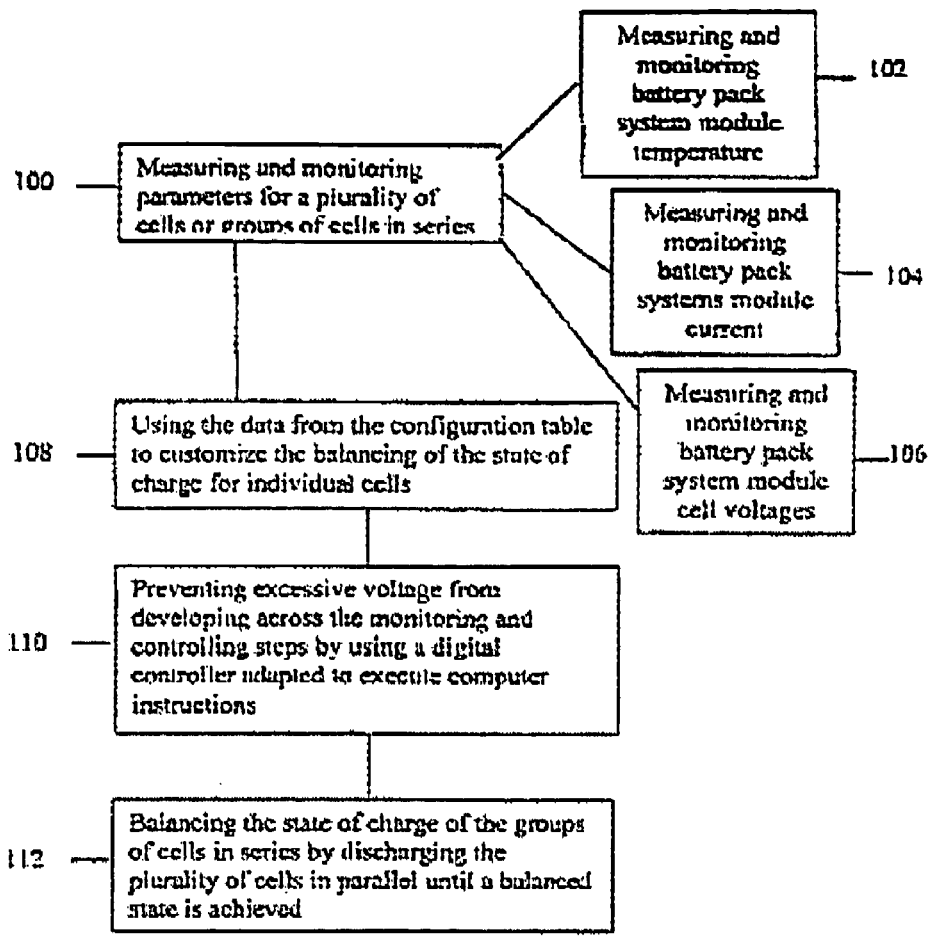
FIG. 6 depicts a sequence of steps used with the safety device to balance the battery pack system module of FIG. 1.

FIG. 6 depicts a sequence of steps used to balance the battery pack system module of FIG. 1.

The method involves monitoring and measuring parameters for a plurality of cells or groups of cells connected in parallel and in series to determine a state of charge for individual cells 100.

The method of step 100 can include the step of monitoring and measuring the temperature of lithium ion cells or groups of lithium ion cells 102, the step of monitoring and measuring the current of the lithium ion cells or groups of lithium ion cells 104, and the step of monitoring and measuring cell voltages for lithium ion cells or groups of lithium ion cells 106.

The monitoring and measuring is performed using a sensing circuit. The circuit includes thermistors, comparitors, resistors, voltage translators and similar components for sensing temperature, voltage and current. The measured data is stored in the digital controller previously noted in FIG. 1.

The next steps involve using data from a configuration table to customize the balancing system for the cells or groups of cells to which the balancing system is connected, the groups of cells, shown in FIG. 1. The step for using the data as indicated in step 108.

An example of the step of using a configuration table can be using a database stored in data storage connected to a processor or using a database stored in memory of a processor which contains the specifications of the cells or groups of cells connected to the battery pack system module. An example of the specifications usable in the configuration table would be Sanyo specifications which describe a particular group of Sanyo cells used in the groups of cells in series.

The specifications can include data such as the capacity ranges of the cells, the temperature limits of the cells, or the range of currents of the cells or another limit of the cell, such as voltages ranges that the cell can be charged between or discharged between. Other data that can be included in the configuration table can be specifications on the load or application to which the battery pack is to be applied, one or more methods for charging the battery pack, the environment for battery pack operation, and maximum application limits.

The method can be used to control excessive current across the cells. The method can be used to make sure the voltage across the cells is within optimum ranges, therefore ensuring voltages are not excessively high or low. The method can be used to control excessive temperatures across the cells connected in series, ensuring that the temperatures are not too high or too low. The method contemplates that the pack can be opened if the temperature is too high, Additionally, the method contemplates steps which provide data to a user interface, such as a graphics user interface (GUI) which indicates when the temperature across the cells or groups of cells is too high and permits user intervention. This step is depicted as element 110. If a GUI is used, the GUI can display multiple parameters, such as temperature, voltage, current, and computed data (for example, capacity, time to empty, time to full, balance status, and the like). These example parameters can be captured or calculated at a future time and most are Smart Battery (SMB) parameters.

Element 112 is the step of balancing the state of charge of groups of cells in series by discharging the groups of cells in series or plurality of cells of cells in parallel until a balanced state is achieved. As shown in FIG. 1, a balancing circuit 25 is used with a shunt resistor and a bypass switch to facilitate the balancing.

The method can be used to achieve a balanced state of charge for the plurality of cells or groups of cells while in a discharge phase, a charge phase, a quiescent phase, and in storage.

Figure 7:
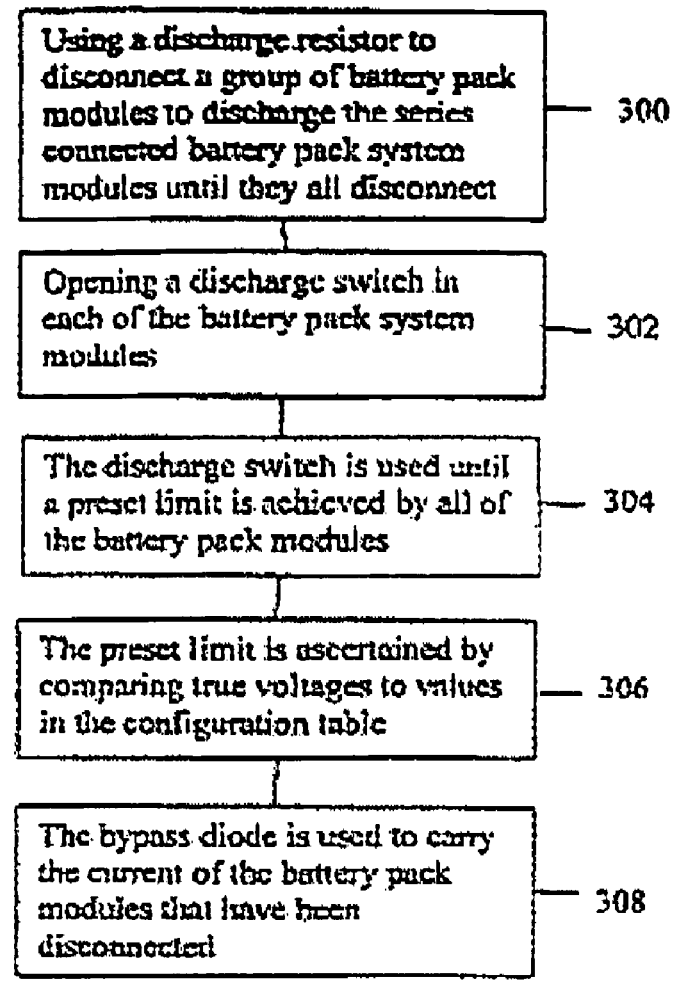
FIG. 7 depict a sequence of steps used with the safety device to balance the battery pack system of FIG. 4.

FIG. 7 depicts another sequence of steps used to balance a battery pack system.

In FIG. 7, the first step is to use a discharge resistor to disconnect a group of battery pack modules to discharge the series connected battery pack system modules until they all disconnect 300.

The method contemplates a sequence of steps wherein the battery pack modules are maintained in a protect stage. Each of the battery pack modules opens up by opening a discharge switch in each of the battery pack system modules 302. The discharge switch can be used until a preset limit is achieved by all of the battery pack modules 304.

The preset limit can be ascertained by comparing true voltages to values in the configuration table 306, which are the values for achieving a balanced state. The bypass diode shown in FIG. 2 can be used to carry the current of the battery pack modules that have been disconnected 308.

Figure 8:
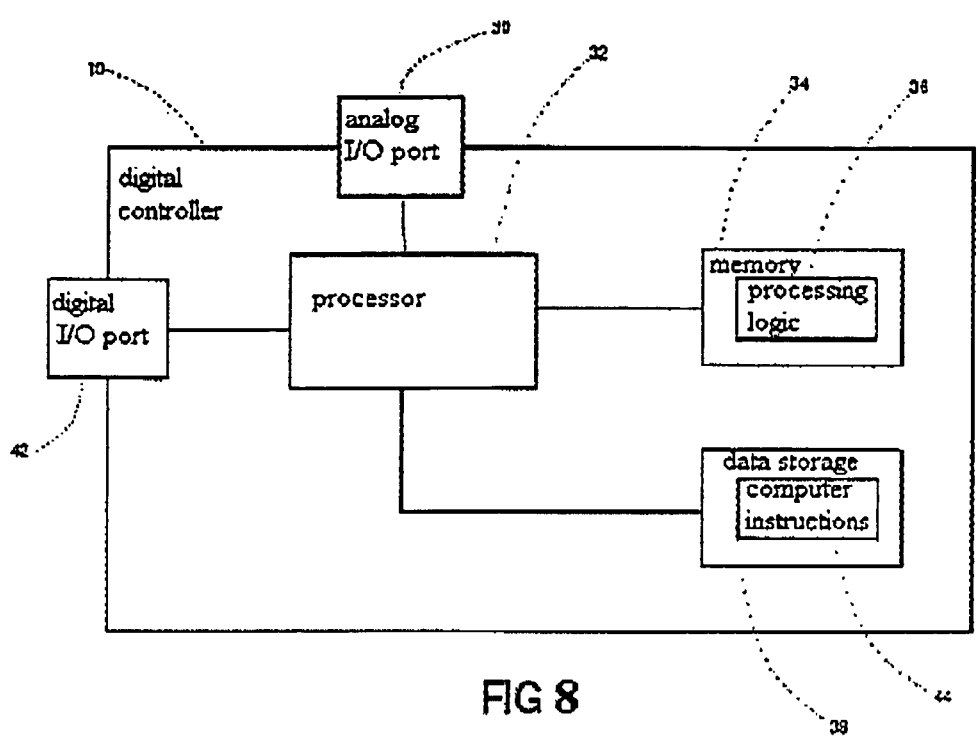
FIG. 8 depicts a digital controller usable in the protective circuitry of an embodiment of the invention.

FIG. 8 shows an embodiment of a digital controller 10, which can include one or more analog I/O ports 30, one or more digital I/O ports 42, a processor 32, and memory 34 with processing logic 36, and computer instructions 44 within data storage 38, or alternatively within memory 34 for directing the processor 32. The digital controller 10 can include at least one configuration table that optionally, can be a programmable table, adapted for storage in memory or data storage. Data storage 38 can be in communication with the processor 32 for storing the computer instructions 44.

The digital controller can be used to execute computer instructions which can monitor and measure the state of charge for the plurality of lithium ion cells or groups of lithium ion cells; monitor and measure current through the plurality of lithium ion cells, monitor and measure temperature of the plurality of lithium ion cells, monitor, initialize, and activate the analog controller, activate at least one disconnect circuit for safety between the plurality of lithium ion cells or groups of lithium ion cells; and activate at least one balancing circuit to achieve balance between the plurality of lithium ion cells or groups of lithium ion cells.

The digital controller is used to execute computer instructions for monitoring the state of charge of the lithium cells or groups of cells and removing at least a portion of the charge to achieve balance between the plurality of cells or groups of cells.

While these embodiments have been described with emphasis on the embodiments, it can be understood that within the scope of the appended claims, the embodiments might be practiced other than as specifically described herein.

What is claimed is:

1. A safety device for balancing a plurality of cells or groups of cells connected in series, or in parallel and in series, comprising:
   a. a controller assembly comprising an analog controller and a digital controller with the plurality of cells or groups of cells connected in series;
   b. a disconnect circuit, comprising a charge switch and a discharge switch connected in series, engaging the controller assembly and the plurality of cells or groups of cells connected in series;
   c. a pack sensing circuit comprising a member selected from the group consisting of a means for measuring temperature, a means for measuring current, and a means for measuring cell voltages; and wherein the pack sensing circuit connects to the controller assembly and the plurality of cells or groups of cells connected in series;
   d. a balancing circuit comprising a shunt resistor connected to a by-pass switch, wherein the balancing circuit connects between the plurality of cells or groups of cells connected in series and engages the controller assembly; and
   e. computer instructions for instructing the controller assembly within the safety device to control the disconnect circuit and the balancing circuit; and wherein the plurality of cells or groups of cells connected in series are balanced when operating in a charging phase, a discharging phase, a quiescent phase, and a storage phase.

2. The safety device of claim 1, wherein the digital controller further comprises at least one configuration table.

3. The safety device of claim 1, further comprising a reverse voltage protection diode for preventing excessive voltage from developing across the controller assembly.

4. The safety device of claim 1, further comprising a bypass diode for balancing a plurality of cells or groups of cells by discharging the plurality of cells or groups of cells until a balance phase is achieved.

5. The safety device of claim 1, wherein the by-pass switch comprises a member selected from the group consisting of a semiconductor switch, a variable resistor, a mini-micro switch or combinations thereof.

6. The safety device of claim 1, wherein the means for measuring temperature is external to the controller assembly.

7. The safety device of claim 1, wherein the means for measuring current is external to the controller assembly.

8. The safety device of claim 1, wherein the means for measuring cell voltages between cells, between groups of cells or combinations thereof is internal to the analog controller.

9. The safety device of claim 1, wherein the digital controller comprises an analog I/O port, a processor, memory with processing logic and computer instructions for directing the processor.

10. The safety device of claim 9, further comprising data storage in communication with the processor for storing the computer instructions.

11. The safety device of claim 1, wherein the computer instructions for controlling the disconnect circuit direct the processor to connect the plurality of cells or groups of cells connected in series to a charger to connect the plurality of cells or groups of cells connected in series to an application.

12. The safety device of claim 1, wherein the plurality of cells is connected together in series forming groups of cells connected in series.

13. The safety device of claim 12, wherein at least two groups of parallel connected cells are connected in series together.

14. The safety device of claim 1, further comprising a voltage regulator communicating with the controller assembly.

15. The safety device of claim 14, wherein the voltage regulator is a DC programmable voltage regulator.

16. The safety device of claim 1, wherein the plurality of cells or groups of cells are lithium ion cells.

* * * * *